United States Patent
Kablaoui

[11] 3,758,589
[45] Sept. 11, 1973

[54] AROMATIZATION OF CYCLOHEXENE DERIVATIVES

[76] Inventor: Mahmoud S. Kablaoui, c/o Texaco Inc. P.O. Box 509, Beacon, N.Y. 12508

[22] Filed: Dec. 3, 1970

[21] Appl. No.: 94,995

[52] U.S. Cl. ........ 260/590, 260/488 CD, 260/618 R
[51] Int. Cl. ........................................... C07c 49/76
[58] Field of Search ......................... 260/590, 668 D

[56] References Cited
UNITED STATES PATENTS
3,153,101  10/1964  Konecky et al. ................ 260/668 D Primary Examiner—Daniel D. Horwitz
Attorney—Thomas H. Whaley, Carl G. Reis and Robert A. Kulason

[57] ABSTRACT

A method of aromatizing substituted cyclohexene to the corresponding aromatic compound comprising contacting a substituted cyclohexene of the formula:

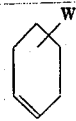

where W is a monovalent radical selected from the group consisting of a hydroxyl group of from one to 10 carbons of the formula:

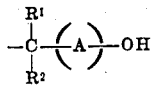

where $R^1$ and $R^2$ are hydrogen or alkyl, A is alkanediyl of from 0 to 9 carbons and a keto group of from three to 22 carbons of the formula:

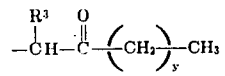

where $R^3$ is hydrogen or alkyl of from one to 9 carbons and y is an integer of from 0 to 10 with a mixture of acetic anhydride and concentrated sulfuric acid optionally in the additional presence of acetic acid at a temperature between about 30 and 145°C. utilizing a mole ratio of sulfuric acid to substituted cyclohexene of between about 1.1:1 and 3:1 and a mole ratio of acetic anhydride to cyclohexene of between about 1:1 and 10:1 to form an intermediate aromatic acetate derivative of the formula:

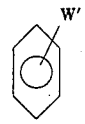

where W' is a monovalent radical selected from the group consisting of

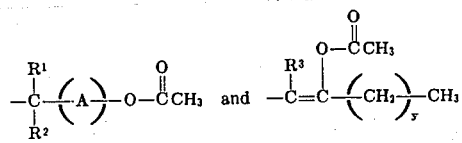

where $R^1$, $R^2$, $R^3$, A and y are as heretofore defined, and subsequently hydrolyzing said acetate derivative to form an aromatic compound of the formula:

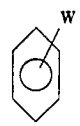

where W is as heretofore defined.

6 Claims, No Drawings

AROMATIZATION OF CYCLOHEXENE DERIVATIVES

BACKGROUND OF INVENTION

This invention relates to the conversion of substituted cyclohexenes into their corresponding aromatic compounds. In the past, one method of aromatizing substituted cyclohexenes was accomplished by passing the substituted cyclohexene through a hot tube at high temperatures, e.g., 200-300°C. over a dehydrogenation catalyst such as palladium on carbon. Although this prior procedure did accomplish aromatization, it had the material deficiency of producing substantial by-products due to thermal decomposition which resulted in sharply reduced yields of desired product.

DESCRIPTION OF THE INVENTION

I have discovered and this constitutes my invention a two stage method of converting substituted cyclohexenes into their corresponding aromatic compounds at moderate temperatures, that is, at temperatures which do not promote substantial by-product formation. The process is relatively rapid, highly selective, relatively inexpensive and high yields of product are accompanied by ease of isolation of the aromatized product.

Specifically, the method comprises first contacting a cyclohexene of the formula:

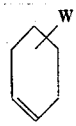

where W is a monovalent radical selected from the group consisting of a hydroxyl group of from one to 10 carbons of the formula:

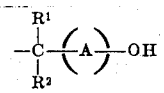

where $R^1$ and $R^2$ are hydrogen or alkyl, A is alkanediyl of from 0 to 9 carbons and a keto group of from three to 22 carbons of the formula:

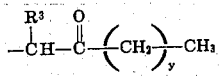

where $R^3$ is hydrogen or alkyl of from one to 9 carbons and Y is an integer of from 0 to 10 with a mixture of acetic anhydride and concentrated sulfuric acid at a temperature between about 30 and 145°C., preferably between 80 and 140°C., more preferably in the presence of acetic acid, utilizing a mole ratio of sulfuric acid to cyclohexene of between about 0.1:1 and 3:1, preferably about 2:1, and a mole ratio of acetic anhydride to cyclohexene of between about 1:1 and 10:1 for a period of between 0.2 and 12 hours or more. As heretofore stated, under preferred conditions, acetic acid is employed and when employed it is utilized in a mole ratio of acetic acid to acetic anhydride of between about 1:0.1 and 1:5, preferably between 1:0.5 and 1:3. At the end of the first stage reaction, there is recovered from the reaction mixture an aromatized acetate intermediate of the formula:

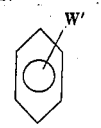

where W' is a monovalent radical selected from the group consisting of

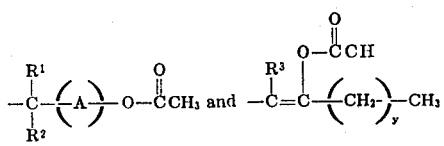

where $R^1$, $R^2$, $R^3$, A and y are as heretofore defined.

In a second stage of the method the aromatized intermediate is contacted (hydrolyzed) with a dilute aqueous acid or base (0.1-1 wt. %) advantageously utilizing a mole ratio of acid or base to acetate of between about 1:1 and 100:1, preferably between 1:1 and 10:1, at a temperature between about 30 and 100°C., preferably under reflux to form an aromatic derivative of the formula:

where W is as heretofore defined. The hydrolysis period in the second stage will primarily depend under commercial conditions by the dictations of the economics of yield versus time but is normally between about 0.5 and 20 hours.

Both the first and second stages of the reaction are advantageously conducted under conditions of agitation in order to facilitate ingredient contact and further are advantageously conducted in an inert gas atmosphere such as nitrogen. In addition, although superatmospheric pressures are contemplated at temperatures above the boiling point of one or more of the reaction ingredients, atmospheric pressure is normally employed.

In the first stage in order to further facilitate ingredient contact and intermediate product recovery diluent may be employed. Suitable examples of such diluents are excess acetic anhydride or other volatilizable solvents such as toluene, benzene, heptane, hexane, chloroform, carbon tetrachloride, chlorobenzene and cyclohexene. The diluents, if employed, advantageously constitute between about 25 and 90 wt. % of the reaction mixture.

The acetate intermediate product can be recovered from the first stage by standard means. One such means of recovery comprises first removing excess acetic anhydride and acetic acid (if employed) via fractional distillation, quenching the residue in water wherein the water content in the resultant quench mixture is between about 2 and 100 volumes/volume residue, said quenching conducted at a temperature advantageously between about 0 and 50°C., extracting the aqueous mixture with a water immiscible volatilizable solvent for the acetate such as ether, benzene, chloroform and carbon tetrachloride, washing the solvent layer with an aqueous alkali base, e.g., 0.1 to 7 wt. % aqueous sodium bicarbonate, subjecting the wash solvent solution to fractional distillation to remove the volatilizable solvent leaving the purified acetate intermediate as residue.

In the second stage of the reaction, that is, the conversion of the acetate into the aromatic derivative as defined, the reaction is preferably conducted under reflux conditions followed by extraction of the formed aromatic derivative from the aqueous acid solution with a water immiscible volatilizable solvent for the resultant derivative such as ether, benzene, chloroform and carbon tetrachloride and separating the solvent in the manner outlined in respect to the recovery of the acetate intermediate.

In regard to the material features of the invention in the absence of sulfuric acid or acetic anhydride in the first stage, no aromatization occurs. If the ratio of sulfuric acid to substituted cyclohexene is less than about 2:1 a substantial portion of the cyclohexene reactant remains unreacted resulting in sharply reduced yields of aromatized product.

By the term "concentrated sulfuric acid" hereinbefore and hereinafter recited an acid composition consisting of between 95 and 100 wt. % $H_2SO_4$ and between 0 and 5 wt. % $H_2O$ is intended.

In respect to the second stage hydrolysis, any acid or base is suitable, however, particularly suitable acids and bases are hydrochloric acid, sulfuric acid, phosphoric acid, nitric acid, potassium hydroxide, sodium bicarbonate, sodium carbonate, sodium bisulfate and pyridine.

Examples of the substituted cyclohexene contemplated herein are 3-cyclohexene-1-methanol, 1-cyclohexenyl acetone, 1-cyclohex-2-ene-2-butanone, 2-cyclohex-2-ene-3-pentanone, 2-cyclohex-2-enyl isopropanol, 1-cyclohex-1-enyl ethanol.

Examples of the acetate intermediates contemplated herein are

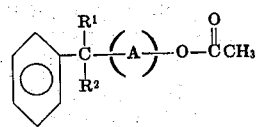

and

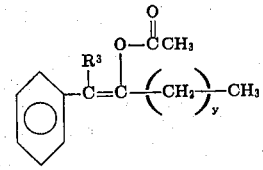

where $R^1$ and $R^2$ are hydrogen, A is zero; $R^1$ is hydrogen, $R^2$ is methyl and A is zero; $R^1$ and $R^2$ are methyl, A is zero; $R^1$ is hydrogen, $R^2$ is ethyl and A is $-CH_2CH_2CH_2CH_2-$; $R^3$ is methyl, y is 1; $R^3$ is hydrogen, y is 1; $R^3$ is ethyl and y is 4; $R^3$ is hydrogen and y is zero.

Examples of aromatic product compounds produced are benzyl alcohol, phenyl acetone, 2-phenyl-3-pentanone, cumyl alcohol α-phenylethyl alcohol and 1-phenyl-2-butanone.

The following examples further illustrate the method of the invention but are not to be construed as limitations thereof.

EXAMPLE I

To a 200 mls. 3-necked flask there were charged 10 grams of 1-cyclohexenyl acetone, 50 mls. of acetic anhydride and 50 mls. of acetic acid. The mixture was cooled to 10°C. and 15.2 grams of concentrated (98 wt. %) sulfuric acid were added and the reaction mixture was refluxed (about 118°C.) for 2 hours under nitrogen. The resultant reaction mixture was quenched in 100 mls. of ice water, stirring for 30 minutes, and then extracted with four 50 mls. portions of ether. The ether extract layers were combined, dried and fractionally distilled. Ether was recovered as overhead at atmospheric pressure and 1-phenyl-2-acetoxyprop-1-ene in an amount of 9 grams was isolated as residue. The isolated product was then introduced into a second 200 mls. 3-necked flask together with 100 grams of (1 wt. %) aqueous hydrochloric acid and the resultant mixture was refluxed for 10 hours at about 100°C. At the end of the refluxing period the reaction mixture was extracted with ether as heretofore described and subsequent to ether removal 5.8 grams of phenyl acetone were recovered as residue representing a yield of 60 wt. % basis cyclohexene reactant.

EXAMPLE II

To a 200 mls. 3-necked flask fitted with a magnetic stirrer, gas sparger, condenser and thermometer there were charged 11.2 grams of 3-cyclohexene-1-methanol and 100 mls. of acetic anhydride. The resultant mixture was cooled to 10°C. and 19.6 grams of concentrated (98 wt. %) sulfuric acid were added. The reaction mixture was refluxed (about 118°C.) for 2 hours under nitrogen. After cooling the solution was quenched in ice water, extracted with ether, dried and stripped as heretofore described in Example I and 10 grams of residue were recovered from the extraction and identified by nuclear magnetic resonance as benzyl acetate. The residue was then subjected to hydrolysis with dilute hydrochloric acid for a period of 3 hours as described in Example I and at the end of the 3 hour period following ether extraction, benzyl alcohol was isolated in an amount of 6.5 grams representing a yield of 60 wt. % basis cyclohexene reactant.

I claim:

1. A method of preparing an aromatic derivative of the formula:

where W is a keto group of from three to 22 carbons of the formula:

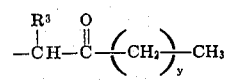

where $R^3$ is hydrogen or alkyl of from one to 9 carbons and y is an integer of from 0 to 10 comprising first contacting a substituted cyclohexene of the formula:

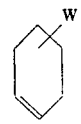

where W is as heretofore defined with a mixture of acetic anhydride and sulfuric acid, said sulfuric acid consisting of between 95 and 100 wt. % $H_2SO_4$ and between 0 and 5 wt. % water, at a first temperature between about 30 and 145°C. utilizing a first mole ratio of sulfuric acid to substituted cyclohexene of between about 0.1:1 and 3:1, and a second mole ratio of acetic anhydride to cyclohexene of between about 1:1 and 10:1, to form an intermediate acetate product of the formula:

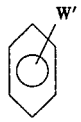

where W' is a monovalent radical of the formula:

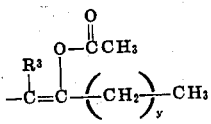

where $R^3$ and y are as heretofore defined, and second contacting said acetate intermediate with a hydrolyzing member selected from the group consisting of aqueous acid or base at a second temperature between about 30 and 100°C. utilizing a third mole ratio of hydrolyzing member to acetate of between about 1:1 and 100:1 and recovering said aromatic derivative from the reaction mixture.

2. A method in accordance with claim 1 wherein said hydrolyzing member is aqueous mineral acid.

3. A method in accordance with claim 1 wherein said first contacting is conducted in the presence of acetic acid utilizing an acetic acid to acetic anhydride mole ratio of between about 1:0.1 and 1:5.

4. A method in accordance with claim 1 wherein said first contacting is conducted in the presence of an inert gas.

5. A method in accordance with claim 4 wherein said acid is hydrochloric acid, said cyclohexene is 1-cyclohexenyl acetone, said acetate is 2-acetoxyprop-1-ene said aromatic derivative is phenyl acetone.

6. A method in accordance with claim 1 wherein said hydrolyzing member is of a concentration of between about 0.1 and 1 wt. % in the aqueous medium.

* * * * *